United States Patent
Kashiyama

(10) Patent No.: US 8,768,956 B2
(45) Date of Patent: Jul. 1, 2014

(54) STREAM DATA PROCESSING METHOD WITH MULTIPLE WINDOWS ON SINGLE STREAM

(75) Inventor: Toshihiko Kashiyama, Santa Clara, CA (US)

(73) Assignee: Hitachi, Ltd., Tokyo (JP)

( * ) Notice: Subject to any disclaimer, the term of this patent is extended or adjusted under 35 U.S.C. 154(b) by 24 days.

(21) Appl. No.: 13/456,064

(22) Filed: Apr. 25, 2012

(65) Prior Publication Data

US 2013/0290367 A1   Oct. 31, 2013

(51) Int. Cl.
*G06F 17/30* (2006.01)
*G06F 7/00* (2006.01)

(52) U.S. Cl.
USPC ............................ 707/769; 707/754; 707/716

(58) Field of Classification Search
CPC .................. G06F 17/30448; G06F 17/30477; G06F 17/3055; G06F 17/30516; G06F 17/30286; G06F 17/30442; G06F 17/30457; G06F 17/30454
USPC .............................................. 719/318; 710/1
See application file for complete search history.

(56) References Cited

U.S. PATENT DOCUMENTS

| | | |
|---|---|---|
| 5,495,600 A | 2/1996 | Terry |
| 2009/0172703 A1* | 7/2009 | Nakano et al. ................ 719/318 |
| 2009/0271529 A1 | 10/2009 | Kashiyama et al. |
| 2010/0106853 A1 | 4/2010 | Kashiyama et al. |

OTHER PUBLICATIONS

R. Motwani et al., "Query Processing, Resource Management, and Approximation in a Data Stream Management System,"In Proc. of the 2003 Conference on Innovative Data Systems Research (CIDR), Jan. 2003. Downloaded from https://database.cs.wisc.edu/cidr/cidr2003/program/p22.pdf.

B. Chandra et al., "A Novel Approach of Finding Frequent Itemsets in High Speed Data Streams," International Conference on Fuzzy Systems and Knowledge Discovery (FSKD), 2011. Downloaded from http://ieeexplore.ieee.org/xpl/freeabs_alljsp?arnumber=6019483.

* cited by examiner

*Primary Examiner* — Ann Chempakaseril
(74) *Attorney, Agent, or Firm* — Procopio, Cory, Hargreaves & Savitch LLP

(57) ABSTRACT

Exemplary embodiments are directed to a combination of real time processing functions and batch time processing functions to process stream data. When a query is received with a target function, the target function is processed based on the utilization of both a real-time processing function and a batch time processing function. The real time processing functions may be executed by a sliding window, and the batch processing function may be executed by a jumping window.

10 Claims, 21 Drawing Sheets

```
register query Q1
IStream (
SELECT S.id, S.val1, S.val2, S.val3,
KMeans(3, S.val1, S.val2) as class
FROM Stream [range 10 minute] as S
WHERE S.val3 > 5 )
```

```
BatchKmeans (int clusteringNumber, Object val1, Object val2) {
    List val1List, val2List;
    if (getTupleFlag() == Tuple.PLUS){
        val1List.add(val1);
        val2List.add(val2);
    } else if (getTupleFlag() == Tuple.MINUS){
        val1List.remove(val1);
        val2List.remove(val2);
    }
    if (getTupleFlag() == Tuple.Jumping) {
        return calcurateMedian(clusteringNumber, val1List, val2List);
    }
    else {
        return Null;
    }
}
```
501

```
RealtimeKmeans(int clusteringNumber, Object val1, Object val2,
    Array medianArray){
    private Double[] distance;
    for (int i = 0; i < medianArray.length; i++){
        distance[i] = calculateDistance (val1, val2, median[i]);
    }
    return calculateMinimumDistanceCluster (distance);
}
```
502

```
register target function {
    Target function = Kmeans
    Batch function = BatchKmeans
    Realtime function = RealtimeKmeans
}
```
503

Fig. 5

Target Function Definition Table

| Target Function | Batch Function | Realtime Function |
|---|---|---|
| KMeans | Batch KMeans | Realtime KMeans |
| PageRank | Batch PageRank | Realtime PageRank |
| | | |

Fig. 6

Jumping Window Interval Table

| Query Name | Interval |
|---|---|
| Q1 | 1 minute |
| Q2 | 100 tuples |

Fig. 7

| Window Interval Adjusting Definition Table | | | |
|---|---|---|---|
| Adjusting Interval 1301 | Upper Threshold 1302 | Initial Jumping Window Size 1303 | Adjusting rate 1304 |
| 1 minute | 80% | 60 seconds | 5% |

CPU Utilization Monitoring Table

| Time | CPU Utilization | Window Interval |
|---|---|---|
| 10:00 | 60% | 1 minute |
| 10:01 | 72% | 57 seconds |
| 10:02 | 79% | 54 seconds |
| 10:03 | 86% | 51 seconds |
| 10:04 | 77% | 54 seconds |

Fig. 14

```
register query Temp
IStream (
    SELECT BatchKMeans(3, S.val1, S.val2)
        as gravity
    FROM Stream [range 10 minute
        jumped every 1 minute] as S
    WHERE S.val3 > 5 )
```
2001

```
register query Q1
IStream (
    SELECT S.id, S.val1, S.val2, S.val3,
        RealtimeKMeans(3, S.val1, S.val2,
            G.gravity) as class
    FROM Stream [range 10 minute] as S,
        Temp [rows 1] as G
    WHERE S.val3 > 5 )
```
2002

Fig. 20

STREAM DATA PROCESSING METHOD WITH MULTIPLE WINDOWS ON SINGLE STREAM

BACKGROUND

1. Field

Exemplary embodiments relate generally to a computer system and, more particularly, to a stream data processing method with multiple windows on a single stream.

2. Technical Background

Stream data processing is widely used. There has been an increasing demand for a data processing system which carries out real-time processing for data continuously arriving at a database management system (hereafter, referred to as "DBMS"). The DBMS carries out processes for data stored in a storage system.

For example, in a system for trading stocks, response time with respect to changes in stock prices is a critical factor for system users. In related art storage systems for which stock data is solely stored in the storage system, the response time of a related art DBMS method for searching through the stored data may not be sufficiently fast with respect to the actual speed of the changes in stock prices, and may result in lost business opportunities. An example related art process utilizes a mechanism which issues stored queries periodically. Therefore, it is difficult to apply such related art mechanisms to real time data processing, when it is necessary to execute a query immediately after data such as stock prices is received.

Data which continuously arrives is known in the related art as "stream data", and related art stream data processing systems have been developed for handling real-time processing of the stream data.

In a related art stream data processing system, queries are first registered to the system, and the queries are executed continuously as data arrives, which is different from the foregoing periodic related art DBMS methods. The related art stream data processing system employs a sliding window, which partially cuts stream data and imparts a lifetime for each parsed portion of the stream data, thus efficiently processing the stream data. An example of a related art query description language including a sliding window specification is continuous query language (CQL).

The CQL includes an extension for specifying the sliding window by using parentheses following a stream name in a FROM clause of a structured query language (SQL), which is widely used for the related art DBMS. There are two types of methods in the related art for specifying the sliding window: (1) a method of specifying the number of data rows to be cut, and (2) a method of specifying a time interval containing data rows to be cut. Related art examples of method (1) involve processes in which data corresponding to 50 rows is cut to be processed. Related art examples of method (2) involve processes in which data for a time interval of 15 minutes is cut to be processed. For the related art examples of (1), the data lifetime is defined to last until 50 pieces of data arrive. For the related art examples of (2), the data lifetime is defined to last 15 minutes. The stream data cut by the sliding window is retained on a memory, and is used for the query processing.

SUMMARY

Aspects of the exemplary embodiments involve a stream data processing method for receiving stream data input information as primary information and for generating secondary information by acquiring primary information within a predetermined period from among the received primary information, which may include managing a plurality of target functions, each of the plurality of target functions relating a first type of processing function from a plurality of first type of processing functions to a second type of processing function from a plurality of second type of processing functions; selecting a target function from the plurality of target functions based on a query; and executing the first type of processing function and the second type of processing function on the acquired primary information to generate the secondary information, based on the selected target function.

Additional aspects of the exemplary embodiments involve a server configured to receive stream data input information as primary information and generate secondary information by acquiring primary information within a predetermined period from among the received primary information, which may include a memory that is configured to manage a plurality of target functions, each of the plurality of target functions relating a first type of processing function from a plurality of first type of processing functions to a second type of processing function from a plurality of second type of processing functions; and a central processing unit (CPU) that is configured to select a target function from the plurality of target functions based on a query; and execute the first type of processing function and the second type of processing function based on the selected target function.

Additional aspects of the exemplary embodiments include a non-transitory computer-readable medium storing instructions for executing a stream data processing method that receives stream data input information as primary information and generates secondary information by acquiring primary information within a predetermined period from among the received primary information. The instructions may include managing a plurality of target functions, each of the plurality of target functions relating a first type of processing function from a plurality of first type of processing functions to a second type of processing function from a plurality of second type of processing functions; selecting a target function from the plurality of target functions based on a query; and executing the first type of processing function and the second type of processing function based on the selected target function.

BRIEF DESCRIPTION OF THE DRAWINGS

These, and or/other aspects will become more readily appreciated from the following description of the embodiments, taken in conjunction with the accompanying drawings, in which:

FIG. 4 illustrates an example query in accordance with an exemplary embodiment.

FIG. 5 illustrates a batch function, a real-time function, and a target function registration, in accordance with an exemplary embodiment.

FIG. 6 illustrates a target function definition table in accordance with an exemplary embodiment.

FIG. 7 illustrates a jumping window interval table, in accordance with an exemplary embodiment.

FIG. 13 illustrates a window interval adjusting definition table in accordance with an exemplary embodiment.

FIG. 14 illustrates a CPU utilization monitoring table, in accordance with an exemplary embodiment.

FIG. 20 illustrates a translated query example, in accordance with an exemplary embodiment.

DETAILED DESCRIPTION

The foregoing related art processes may encounter several problems. For example, some statistics or data mining methods in the related art utilize a recursive approach. When the related art stream data processing engine utilizes such recursive approaches, the processing cost may be very high because the engine may need to perform recalculation every time new data is input.

Figure 1:
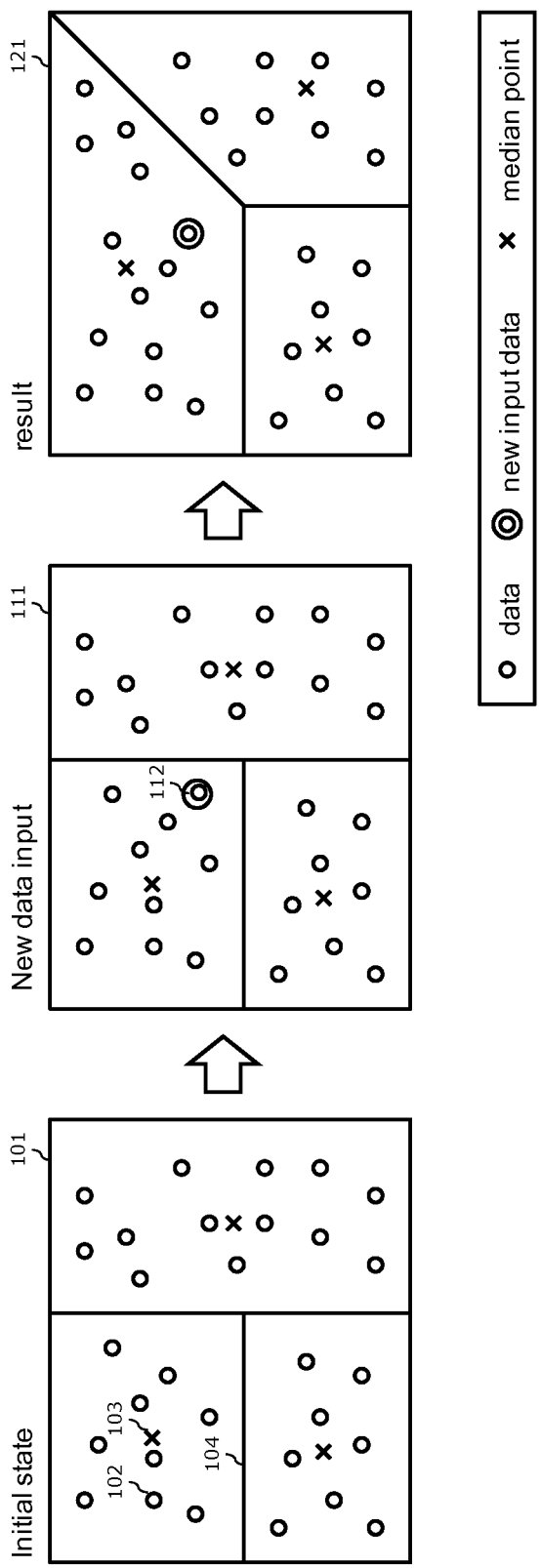
FIG. 1 illustrates the changing of clusters from new input data based on an exemplary clustering method.

FIG. 1 illustrates the changing of clusters from new input data based on an exemplary related art clustering method.

The exemplary clustering method includes K-means, a clustering method which partitions observations of data points into k clusters. Each observation belongs to the cluster with the nearest median. K-means sets initial k points and reiterates an assignment step and an update step until the data points are processed into k clusters.

In the assignment step, each data point is assigned to the cluster with the closest median. In the update step, the new medians of the data points in the cluster are calculated.

As shown in FIG. 1, in the initial state 101, data 102 is partitioned into three clusters as divided by boundary 104. Each data belongs to the cluster with the nearest median 103. New input data 112 is assumed to be input in initial state 101. In new data input state 111, the stream data processing engine reiterates the assignment step and the update step from current medians to produce result state 121.

The processing cost of K-means may be very high because the engine recalculates every time data is input. Various related art processes have thereby attempted to decrease the processing cost of stream data processing.

In a related art example, jumping windows are used against stream data to decrease processing cost. A sliding window such as a tuple-based window, a time-based window, or a partitioned-based window is used to slide each data. For example, a tuple-based window holds n tuples in a window. When new data is input into a window, the oldest data is removed from the window. On the other hand, a jumping window slides with the jump of the sub-window size. For example, when n/4 data is input into a tuple-based jumping window, the oldest n/4 data is removed from the window (the sub-window size is n/4).

However, this related art example may increase latency. In the above example, the new result is input after n/4 data is input. The related art example may not be able to process in real-time due to the latency.

The exemplary embodiments are directed to combining real-time processing while reducing processing cost. The exemplary embodiments are directed to processes that combine real-time processing (which may sacrifice on accuracy for speed) and batch processing (which may have high accuracy). The exemplary embodiments are directed to stream data processing systems and methods that receives stream data input information as primary information, and generates secondary information by acquiring primary information within a predetermined period from among the received primary information. The primary information or acquired primary information may be processed by a query execution module constructed by the exemplary embodiments for generating the secondary information.

The real-time processing in the exemplary embodiments utilize a sliding window that can process in real-time. The batch processing in the exemplary embodiments can correct errors made by real-time processing periodically by utilizing jumping window and data mining algorithms.

In contrast to examples in the related art, two functions, a batch function and a real-time function, are defined and utilized instead of a single related art function. The two functions may be defined by the user. Exemplary embodiments manage a plurality of target functions. Each of the plurality of target functions may be grouped or relate to several different types of processing functions. A target function may be selected based on a query and executed by utilizing one or more of the plurality of target functions. For example, a first type of processing function may involve real time functions, or functions that process data streams in real time. One or more of the plurality of target functions may be grouped as a real time function. A second type of processing function may involve batch processing functions, or functions that conduct batch processing on data streams. The selected target function may be formed and executed based on a combination of processing functions selected from the first type of processing functions and second type of processing functions. These functions are discussed further below.

Although a query may only contain one function, a query parser in the stream data processing engine produces two operators for the real-time function and the batch function in an execution tree, in accordance with exemplary embodiments. Then, a real-time processing function is executed by utilizing a sliding window, and a batch processing function is executed by utilizing a jumping window.

Figure 2:
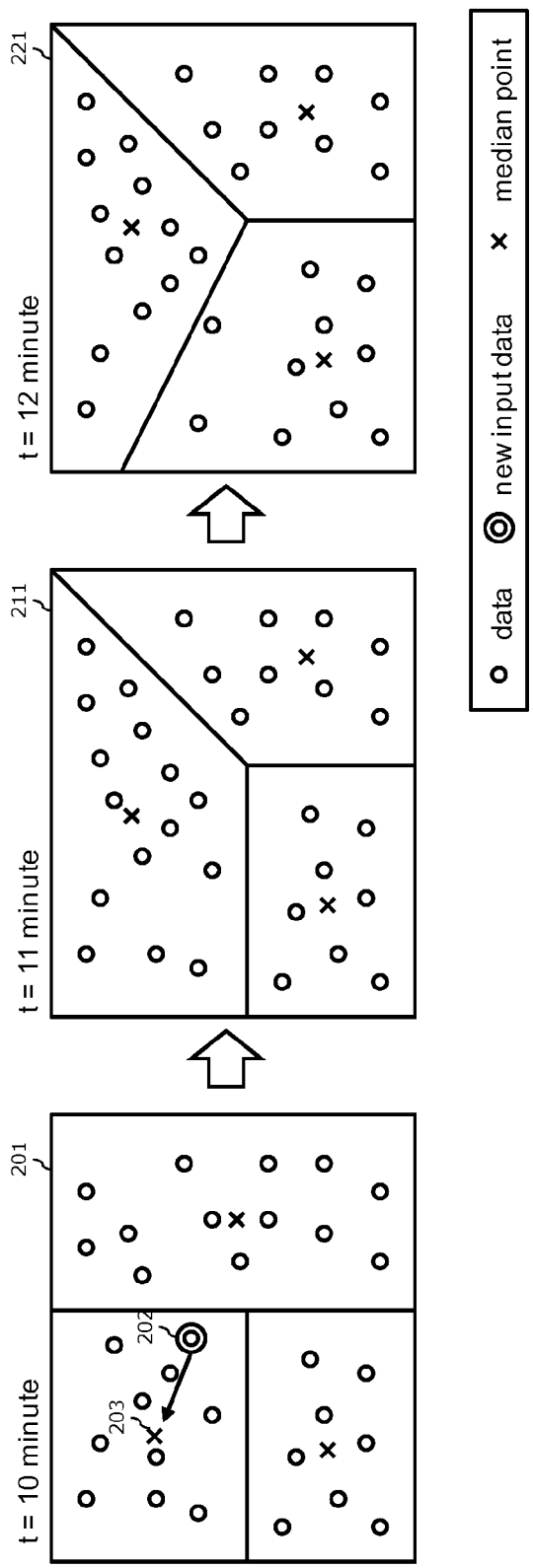
FIG. 2 illustrates the changing clusters by new input data in accordance with an exemplary embodiment.

FIG. 2 illustrates the changing clusters by new input data in accordance with an exemplary embodiment. In the example depicted in FIG. 2, two k-means functions are used. The first type of k-means function, which is a batch function, calculates the cluster median. The second type of k-means function, the real-time function, calculates the distance to each median by conducting an assignment step once. As depicted in FIG. 2, at state 201, which depicts a state at t=10 minutes, new data 202 is input. The distance between the new data 202 and the median 203 is presumed to be the distance closest to the new median. The new data 202 is therefore partitioned into a cluster having median 203.

The median will be changed by the new data 203 and may change partition when the median is changed, which may differ from the aforementioned partitioning. The exemplary embodiments ignore this discrepancy in real-time processing and correct for the discrepancy in the batch time processing. For example, at state 211, where t=11 minutes, a jumping window is executed for resolving the partition of the median, which resolves into state 221.

Exemplary embodiments are further described in detail below.

First Exemplary Embodiment

In a first exemplary embodiment, the jumping window interval is set by the user.

Figure 3:
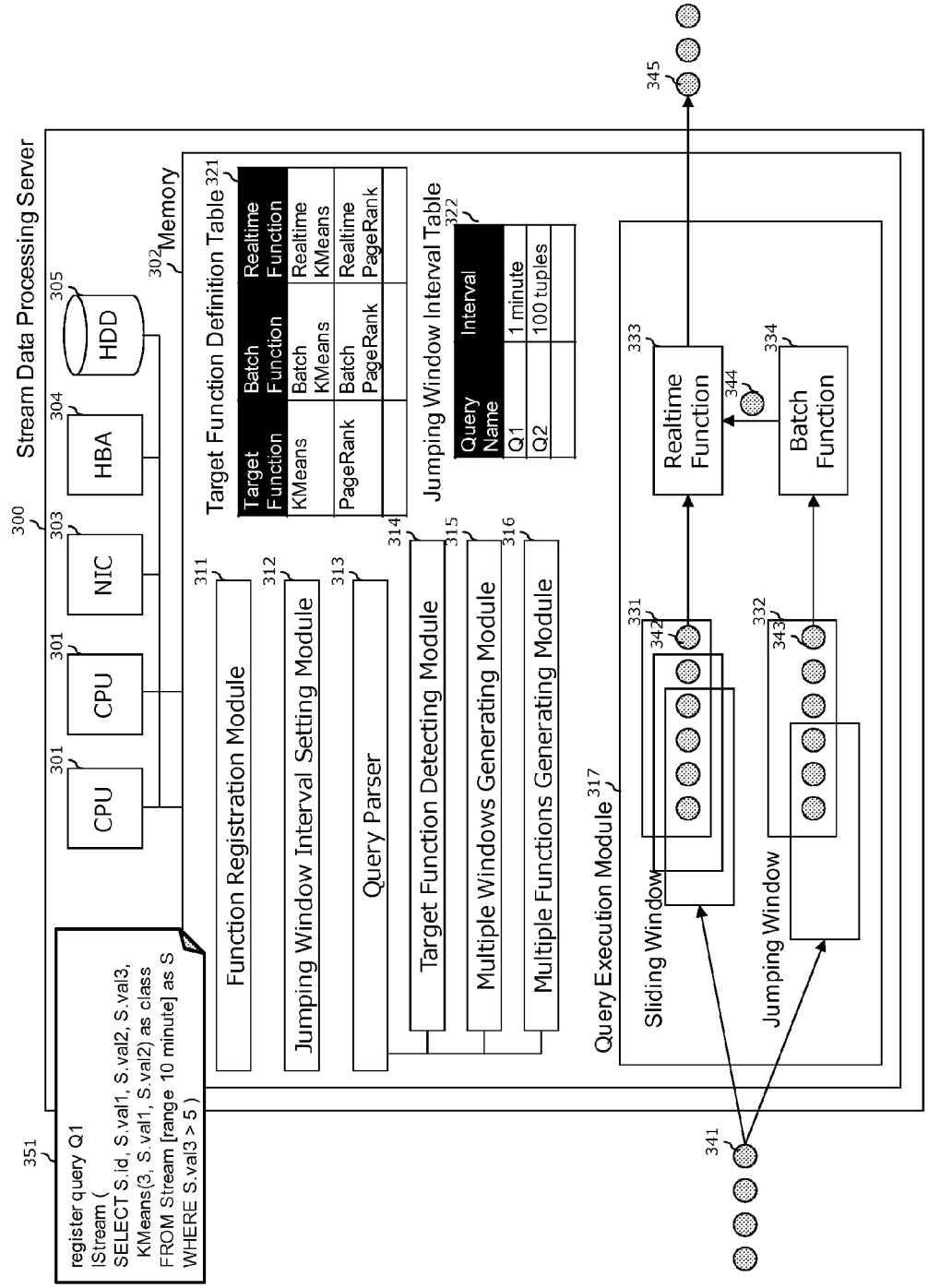
FIG. 3 illustrates an exemplary hardware configuration upon which the exemplary embodiments may be implemented.

FIG. 3 illustrates an exemplary hardware configuration upon which the exemplary embodiments may be implemented. FIG. 3 illustrates a stream data processing server 300 which may include one or more Central Processing Units (CPUs) 301, an Network Interface Controller (NIC) 303, a Host Bus Adapter (HBA) 304, a hard disk drive (HDD) 305 and a memory 302. The stream data processing server 300 may also include a function registration module 311, a jumping window interval setting module 312, a query parser 313, a target function detecting module 314, a multiple windows generating module 315, and a multiple functions generating module 316. The memory may also include a target function definition table 321, a jumping window interval table 322, and a query execution module 317.

The function registration module 311 registers functions, including but not limited to, a target function, a batch function, and a real-time function. The target function, batch function, and real-time function are stored in target function definition table 321. Further details about function registration module 311 and target function definition table 321 are described with respect to FIG. 6 and FIG. 10.

Jumping window interval setting module 312 registers a jumping window interval and updates jumping window interval table 322. Further details about the jumping window interval setting module 312 and the jumping window interval table 322 are described with respect to FIG. 7 and FIG. 10.

Query parser 313 parses a query input into the system and creates a query execution module 317 based on the query 351. The query parser 313 may utilize a target function detecting module 314, a multiple generating module 315, and a multiple functions generating module 316 to create a function for query execution module 317. Further details about query parser 313 is described with respect to FIG. 10 and FIG. 11.

The query parser 313 calls the target function detecting module 314, the multiple generating module 315, and the multiple functions generating module 316. Target function detecting module 314 checks whether the query utilizes target functions defined in target function definition table 321. Further detail for the target function detecting module 314 are disclosed with respect to FIG. 11. The multiple windows generating module 315 generates a sliding window 331 and/or a jumping window 332 based on instructions received from query execution module 317. The multiple functions generation module 316 generates a real-time function 333, and/or batch function 334 based on instructions received from query execution module 317. Further details about the target function detecting module 314, the multiple generating module 315 and the multiple functions generating module 316 are described with respect to FIG. 11.

Query execution module 317 executes queries made by query parser 313 in run-time and generates an execution tree. The execution tree may include operations such as the sliding window 331, jumping window 332, real-time functions 333, and batch functions 334. The operations may be connected by a queue and executed by an operator scheduler. Further description about query execution module 317 is described with respect to FIG. 8 and FIG. 9.

As depicted in FIG. 3, sliding window 331 and jumping window 332 hold input data 341 for a prescribed time. The real-time function operator 333 combines the sliding window data 342 and batch function output data 344 for processing functions in real-time. The batch function operator 334 processes jumping window data 344. The resulting data 345 is output.

FIG. 4 illustrates an example query in accordance with an exemplary embodiment.

In the example query 401, the query name is Q1 (register query Q1). Example query 401 also contains parameters for holding tuples of a stream (called "Stream") within a range of past ten minutes (FROM Stream [Range 10 minute] as S). Example query 401 also filters tuples which satisfies val3>5 (WHERE S.val3>5), calculates Kmeans (3, S.val1, S.val2), which partitions into three clusters based on val1, and val2, and rename a function output as class (Kmeans 3, S.val1, S.val2) as the class. Example query 401 also extracts multiple columns, id, val1, val2, val3, and class (SELECT S.id, S.val1, S.val2, S.val3, KMeans(3, S.val1, S.val2) as class), and outputs the new result by new data input (ISTREAM).

FIG. 5 illustrates a batch function, a real-time function, and a target function registration, in accordance with an exemplary embodiment.

Exemplary embodiments may utilize one or more functions, such as a batch function 501, a real-time function 502, and a target function registration 503. Batch function 501 utilizes two lists, val1 list and val2 list, which are utilized to hold tuples in a window. Batch function 501 may also utilize a function (e.g. calculate median) to calculate the median. In the example depicted in batch function 501, the calculate median function returns three medians of each partition. The real-time function 502 calculates distances between input data (val1, val2) and medians calculated from the batch function 501. The real-time function 502 returns a cluster id which may indicate the minimum distance between the input data and the medians.

Target function registration 503 registers functions for the exemplary embodiments. In the example depicted in target function 503, the target function name is registered as Kmeans, the batch function name is registered as BatchKmeans, and the real-time function name is registered as RealtimeKmeans.

FIG. 6 illustrates the target function definition table 321 as shown in FIG. 3, in accordance with an exemplary embodiment.

Target function definition table 321 may include entries for a target function 601, a batch function 602, and a realtime function 603. The target function column 601 indicates the function registered in the query 503. The batch function column 602 indicates the function registered in the batch function definition 501. The realtime function column 603 indicates the function registered in the realtime function definition 502.

In an example entry 611, target function registration 503 is registered with target function definition table the function Kmeans. As indicated by example entry 611, the target function is registered as Kmeans, the batch function is registered as BatchKmeans, and the realtime function is registered as RealtimeKmeans.

FIG. 7 illustrates a jumping window interval table 322, as shown in FIG. 3, in accordance with an exemplary embodiment.

In the example of FIG. 7, jumping window interval table 322 contains columns for a query name 701, and an interval 702. The query name 701 indicates the name of the query, whereas the interval column 702 indicates the jumping window interval for a corresponding query. In example entry 711, the jumping window interval is one minute for query name Q1.

Figure 8:
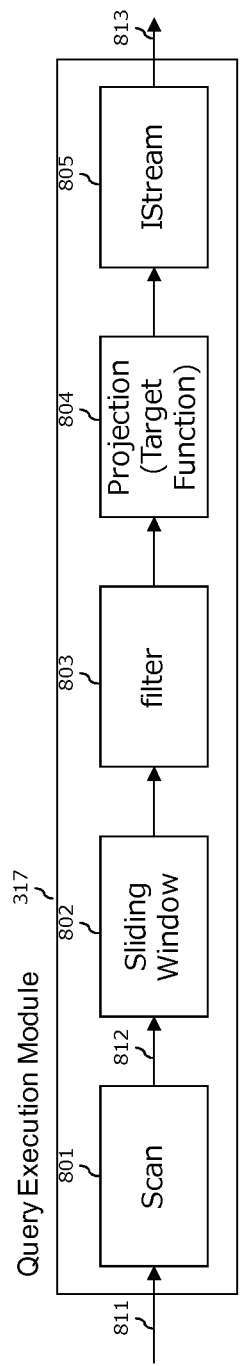
FIG. 8 illustrates a query execution module, in accordance with an exemplary embodiment.

FIG. 8 illustrates a query execution module, in accordance with an exemplary embodiment.

In the example of FIG. 8, a query execution module 317 as shown in FIG. 3 is configured when the query 401 is parsed. The configuration of the query execution module 317 is generated by the query parser 313 (as shown in FIG. 3) when the query registration command 401 (as shown in FIG. 4) is executed. The query execution module 317 may contain one or more operators, with each operator serving as an execution module for performing a process. Queues 812 may connect the operators with each other as needed.

In the example shown in FIG. 8 streamed data 811 is input into the query execution module 317 as an input tuple. The processing result of the query from the operators of the query execution module 317 is output as the realtime output result 813. The operators utilized in query execution module 317 may vary in type depending on the process utilized. For example, scan operator 801 operates to add a time stamp to the input tuple 811. The sliding window operator 802 operates to cut out data rows from the data stream 811 by specifying a time interval for cutting out data rows. Sliding window operator 802 is operable to perform a process of converting the stream data 811 into a tuple set (FROM Stream [Range 10 minute] as S). The filter operator 803 is operable to perform a process for determining whether the tuples are output, based on predetermined conditions (e.g., WHERE S.val3>5). The projection operator 804 is operable to perform a process for outputting at least a portion of the columns and may be further operable to calculate the registered function, (SELECT S.id, S.val1, S.val2, S.val3, KMeans (3, S.val1, S.val2) as class). A streaming operator 805 is operable to perform a process for converting the tuple set into the stream data 201 (ISTREAM).

In addition to the operators shown in FIG. 8, other operators may also be utilized in the query execution module 317. For example, a join operator can be used to perform a process of joining two or more data streams under a giving or specified condition. An aggregation operator may be utilized to perform an aggregation process, which may be represented by a derivation of a sum, an average, a maximum, a minimum, a count, a variance, a standard deviation, a median, and so forth.

Figure 9:
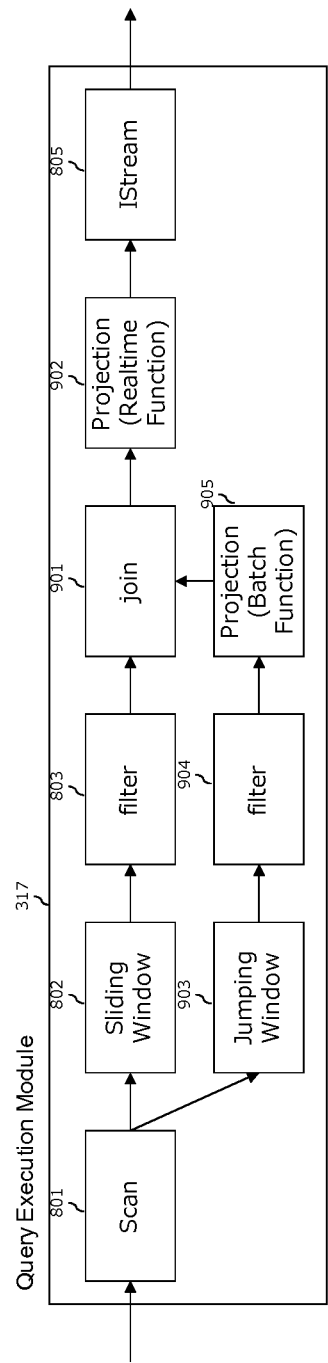
FIG. 9 illustrates an example of query execution module when the query is parsed with query parser, in accordance with an exemplary embodiment.

FIG. 9 illustrates an example of query execution module 317 when the query 401 is parsed with query parser 413, in accordance with an exemplary embodiment. The scan operator 801, sliding window operator 802, filter operator 803, and istream operator 805 are the same as shown in FIG. 8. Filter operator 904 is the same as the filter operator 803.

Join operator 901 performs a process of joining two or more stream data under a given condition. In the example of FIG. 9, the join operator 901 joins the result of the filter operator 803 and the result of the projection operator 905. Projection operator 902 is similar to projection operator 804 of FIG. 8, with a function change from a target function into a realtime function. Projection operator 905 is also similar to projection operator 804 from FIG. 8, with a function change from a target function into a batch function.

Figure 10:
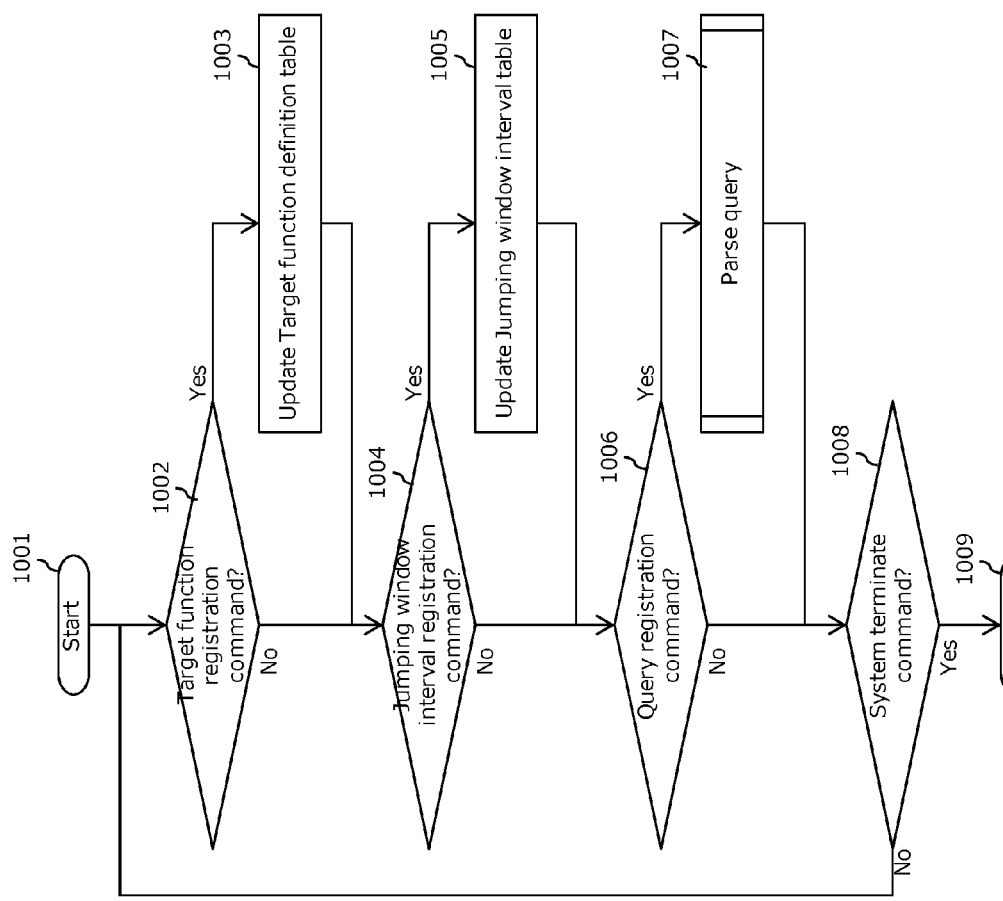
FIG. 10 illustrates a flow chart for processing an input command, in accordance with an exemplary embodiment.

FIG. 10 illustrates a flow chart for processing an input command, in accordance with an exemplary embodiment. At 1002, the input command is processed by the function registration module 311 (as shown in FIG. 3), which determines if the input command is a target function registration command as illustrated from FIG. 5. If the input command is a target function registration command, the function registration module 311 updates the target function definition table 321 at 1003. At 1004, the input command is processed by the jumping window interval setting module 312 (as shown in FIG. 3), which determines if the input command contains a jumping window interval setting command (as shown in FIG. 7). If the input command contains a jumping window interval setting command, the jumping window interval setting module 312 updates the jumping window interval table 322 at step 1005. At 1006, the query parser 313 (as shown in FIG. 3) determines if the input command contains a query registration command (as shown in FIG. 4). If the query parser 313 determines that the input command contains a query registration command, the query parser 313 parses the query at 1007 (as shown, for example, at FIG. 11). At 1008, the stream data processing system 300 (as shown in FIG. 3), determines if the input contains a system terminate command. If the input command contains a system terminate command, the stream data processing system 300 terminates the processing for the input command at 1009. Otherwise, the procedure returns to 1002.

Figure 11:
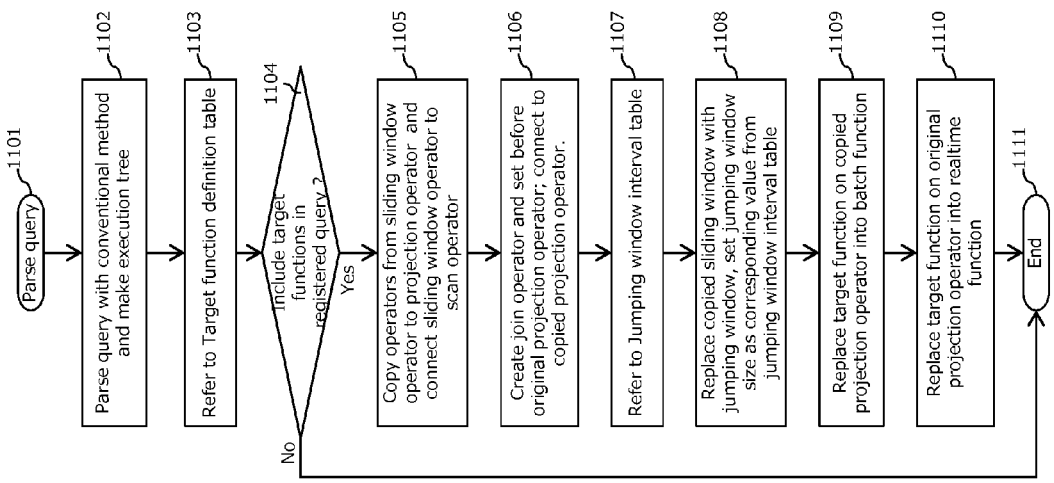
FIG. 11 illustrates a flow chart for processing a query, in accordance with an exemplary embodiment.

FIG. 11 illustrates a flow chart for processing a query, in accordance with an exemplary embodiment. At 1101, query parser 313 (as shown in FIG. 3), receives a query for parsing. At 1102, query execution module 317 is generated based on the parsing of the query. At 1103, the target function detection module 314 (as shown in FIG. 3) refers to the target function definition table 321 for further processing of the query. At 1104, based on referencing the target function definition table 321, the target function detection module 314 determines if the registered query includes target functions from the target function definition table 321.

If no target functions are found within the query, then the procedure terminates to 1111. If the target functions are found, then the procedure proceeds to 1105. At 1105, the multiple windows generating module 315 (as shown in FIG. 3), copies operators from the sliding window operator to the projection operator and connects the sliding window operator to the scan operator. At 1106, the multiple windows generating module 315 generates a join operator, and sets the join operator before the original projection operator. The multiple windows generating module 315 connects the join operator to the copied projection operator. At 1107, the multiple windows generating module 315 refers to the jumping window interval table 322 for further processing of the registered query. At 1108, based on referencing the jumping window interval table 322, the multiple windows generating module 315 replaces the copied sliding window with a jumping window, and sets the jumping window size to correspond to the values in the jumping window interval table 322. At 1109, the multiple functions generating module 316, (as shown in FIG. 3) replaces the target function in the copied projection operator with a batch function. At 1110, the multiple functions generating module 316 replaces the target function in the original projection operator with a realtime function.

For example, suppose a query as shown in FIG. 4 is registered at 1101. At 1102, the query parser 313 would parse the query from FIG. 4 to generate the query execution module as shown in FIG. 8. At 1104, because the querying from FIG. 4 includes a Kmeans function, processing would proceed to 1105. At 1105, based on the query from FIG. 4, the sliding window operator 802, the filter operator 803, and the projection operator 804 are copied. The copied operators (as shown in FIG. 9) are copied as the jumping window operator 903 (which functions as a sliding window operator), filter operator 904, and projection operator 905 (where the batch function still functions as the target function). The jumping window operator 903 is connected to the scan operator 801. At 1106, the join operator 901 is created, and connected to the filter operator 803, the projection operator 905, and the projection operator 902. From the preceding copying, the projection operator 902 (the realtime function) is still the same as projection operator 804 (the target function).

In this example, in Step 1108, copied sliding window operator 903 is replaced into jumping window operator 903. Jumping window interval in the jumping window operator 903 is set to "1 minute" shown in FIG. 7. At 1109, the target function (Kmeans) of the copied projection operator 905 is replaced with the batch function (BatchKmeans). At 1110, the target function (Kmeans) of the projection operator 804 is replaced with the realtime function (Realtimekmeans) of the projection operator 902.

Second Exemplary Embodiment

In a first exemplary embodiment as described above, the jumping window interval is set by the user. In a second exemplary embodiment, the stream data processing engine adjusts the jumping window interval based on the monitoring of information, (e.g., CPU utilization). As the jumping window interval is shortened, the batch function is executed with increasing frequency, thus improving the accuracy of the realtime processing. However, CPU utilization may increase as the jumping window interval is shortened. In the second exemplary embodiment, the stream data processing engine may adjust the jumping window based on CPU utilization.

Figure 12:
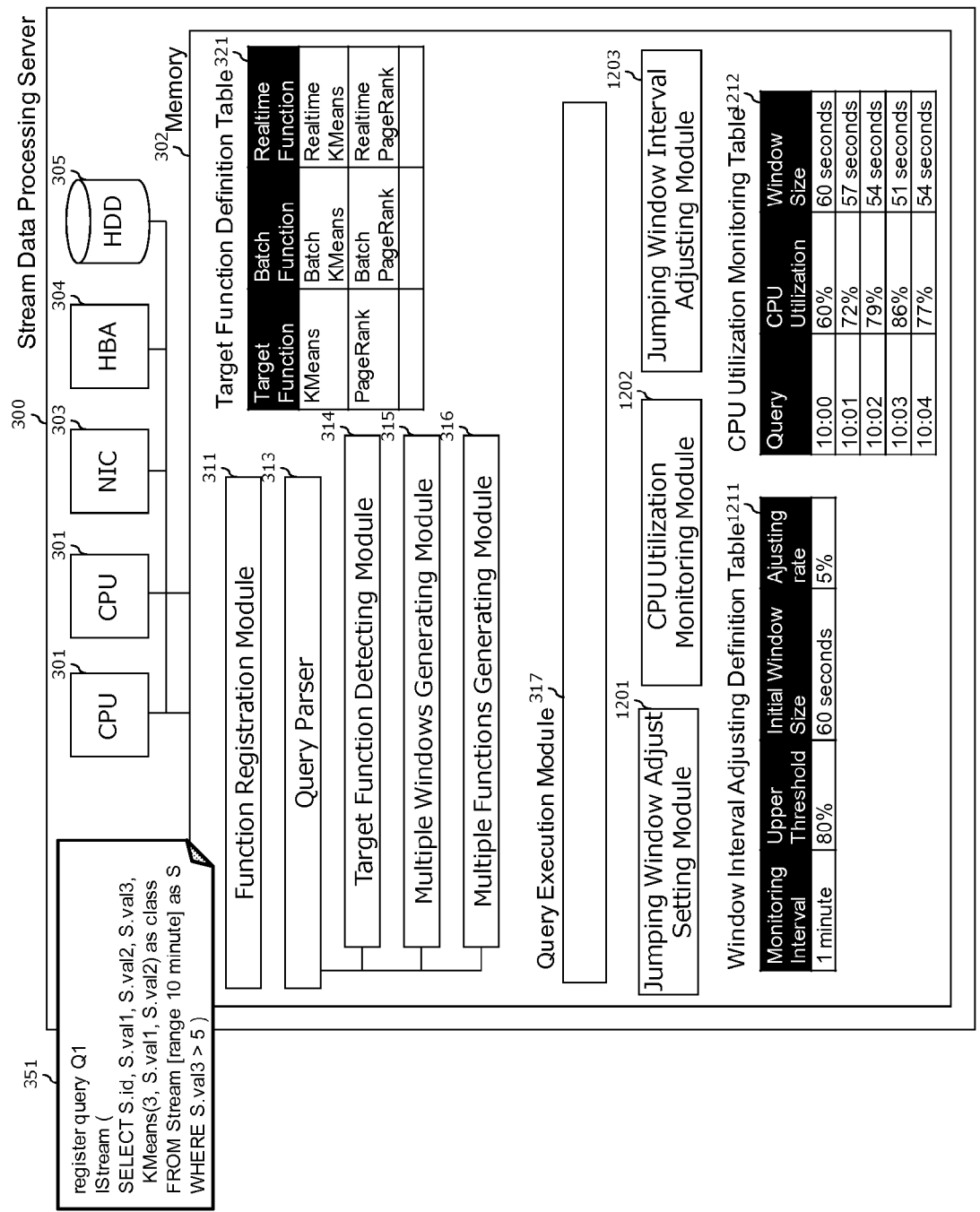
FIG. 12 illustrates a hardware configuration in accordance with an exemplary embodiment.

FIG. 12 illustrates a hardware configuration in accordance with an exemplary embodiment.

The description for the elements that are also used in the first exemplary embodiment from FIG. 3 are omitted for clarity. In the second exemplary embodiment, the jumping window interval setting module 312 and the jumping window interval table 322 are not utilized.

In the second exemplary embodiment, a jumping window adjust setting module 1201 may be used for storing information such as the monitoring interval, the upper threshold, the initial window interval, the adjusting rate, and other information. The jumping window adjusting information may be configurable by a user. Further details of the jumping window adjust setting module 1201 are provided in FIG. 13.

The CPU utilization monitoring module 1202 is updated based on the jumping window adjusting information from the jumping window adjust setting module 1201. The CPU utilization monitoring module 1202 monitors CPU utilization and updates the CPU utilization monitoring table 1212 based on the monitored CPU utilization. Further details of the CPU utilization monitoring module 1202 are provided in FIG. 14.

The jumping window interval adjusting module 1203 refers to information from the CPU utilization monitoring module 1202, and information from the CPU utilization monitoring table 1212 to adjust the jumping window interval. The jumping window interval may be adjusted by the jumping window interval adjusting module 1203 based on CPU utilization.

The window interval adjusting definition table 1211 stores information for adjusting the window interval. Further details of the window interval adjusting definition table 1211 are provided in FIG. 13.

The CPU utilization monitoring table 1212 contains information regarding the CPU utilization of the system. Further details for the CPU utilization monitoring table 1212 are provided in FIG. 14.

FIG. 13 illustrates a window interval adjusting definition table in accordance with an exemplary embodiment.

The window interval adjusting definition table may contain several parameters. For example, the adjusting interval column 1301 indicates how often the jumping window interval is to be adjusted. In the example entry 1311, the jumping window interval is adjusted every minute by the jumping window interval adjusting module 1203.

The upper threshold column 1302 indicates the upper threshold for CPU utilization. In the example entry 1311, the upper threshold for the CPU utilization is set at 80%. If CPU utilization rate is less than or equal to 80%, the jumping window interval will be shortened. On the other hand, CPU utilization rate is over 80%, the jumping interval will be lengthened. The upper threshold can be adjusted as needed and is not limited to the example of 80% as in example entry 1311.

The initial jumping window interval column 1303 indicates the initial value of the jumping window interval. In the example entry 1311, the initial value of the jumping window interval is 60 seconds.

The adjusting rate column 1304 indicates the degree to which the jumping window interval is adjusted, based on the adjust interval and upper threshold. In the example entry 1311, the jumping window interval is shortened/lengthened 5% at a time. The degree to which the jumping window is adjusted may be adjusted as needed, and is not limited to the example of 5% as in example entry 1311.

FIG. 14 illustrates a CPU utilization monitoring table, in accordance with a second exemplary embodiment.

The CPU utilization monitoring table may store information regarding the CPU utilization and can include a time column 1401, a CPU utilization column 1402, and a window interval column 1403. The time column 1401 is a timestamp indicating when the information was recorded. The CPU utilization 1402 indicates the level of CPU utilization by the system at the time 1401. The window interval column 1403 indicates the length of the jumping window interval. Exemplary entries 1404 are based on information from the window interval adjusting definition table from FIG. 13. In the exemplary entries 1404, the window interval was shortened by 5% (3 seconds) from the time of 10:00 to 10:03 as the CPU utilization 1402 was indicated to be less than the threshold (80%). However, from time T:03 to T:04 the window interval was lengthened by 5% (3 seconds) because a CPU utilization exceeded the threshold of 80% at time 10:03.

Figure 15:
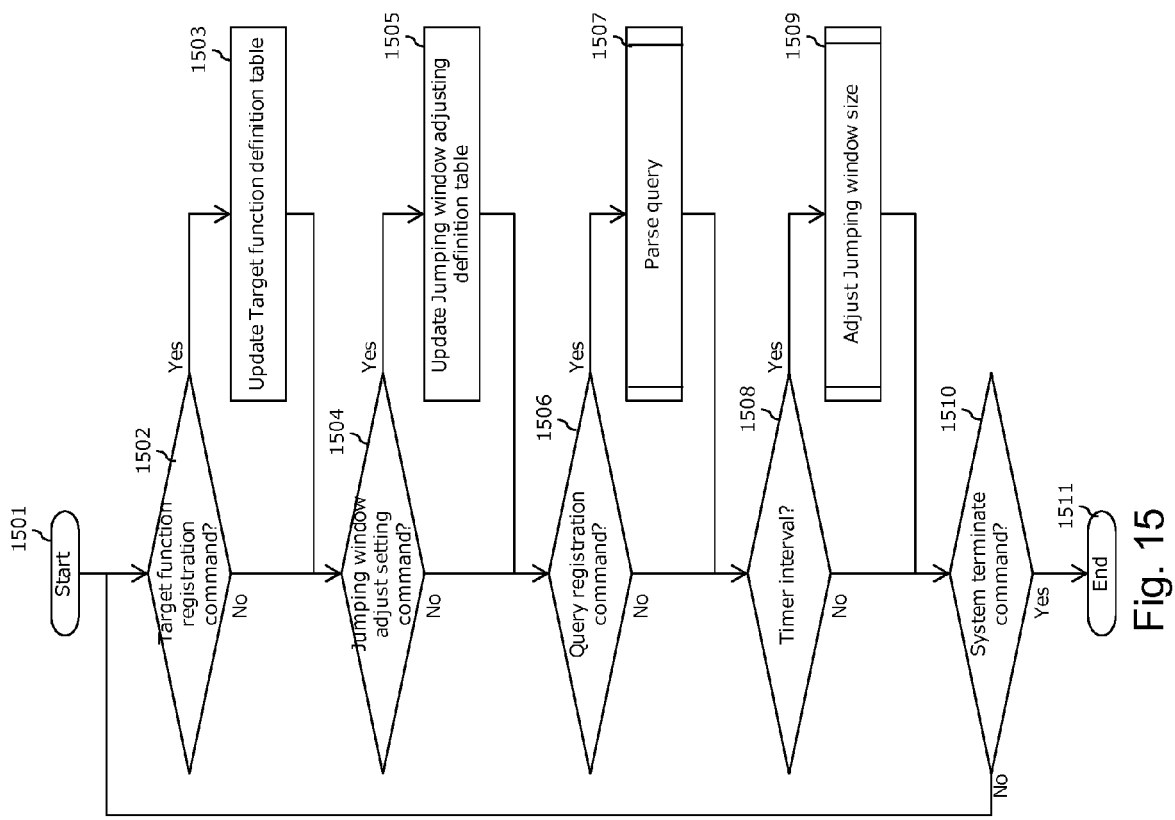
FIG. 15 illustrates a flow chart for the query parser in accordance with an exemplary embodiment.

FIG. 15 illustrates a flow chart for the query parser in accordance with an exemplary embodiment. In FIG. 15, process elements 1501, 1502, and 1503 are the same as process elements 1001, 1002, and 1003 respectively from FIG. 10. The description is thereby omitted for clarity.

At 1504, the jumping window adjust setting module 1201 (as shown in FIG. 12) determines whether the input command is a jumping window adjust setting command as shown in FIG. 13. At 1505, if the input command is a jumping window adjust setting command, the jumping window adjust setting module 1201 updates the window interval adjusting definition table.

Process elements 1506 and 1507 are the same as 1006 and 1007, respectively, as shown in FIG. 10. The initial jumping window interval is configured in window interval adjusting definition table 1211. At 1508, the jumping window size is adjusted (as shown in process element 1509) based on a timer interval. Further detail of the adjustment is provided in FIG. 16. Process elements 1510 and 1511 are the same as process elements 1008 and 1009, respectively, as shown in FIG. 10.

Figure 16:
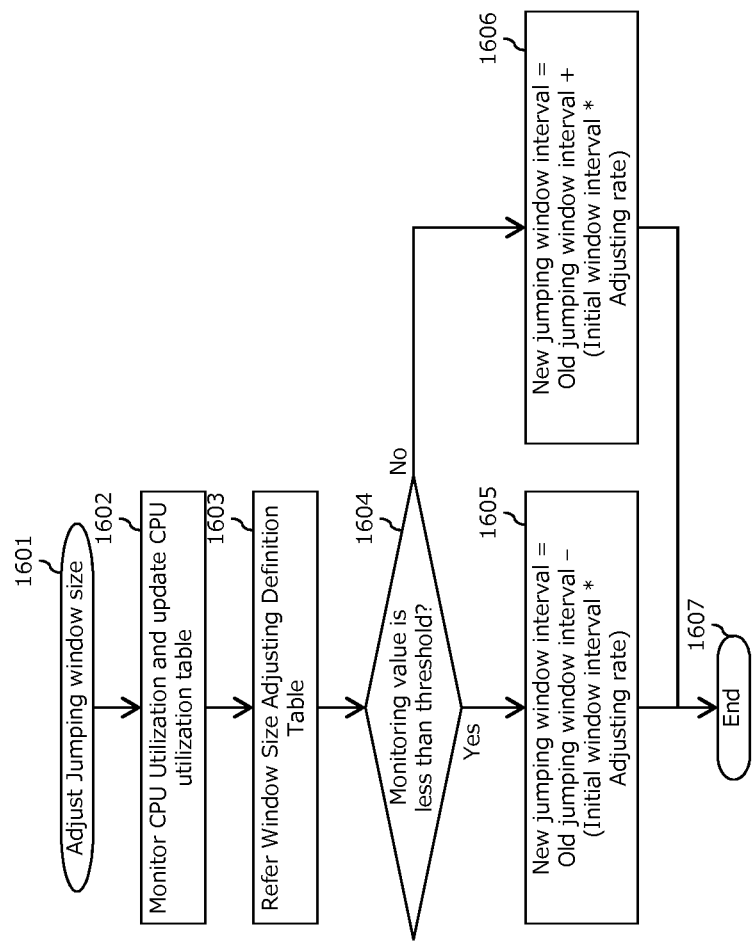
FIG. 16 illustrates a flow chart for adjusting a window size in accordance with an exemplary embodiment.

FIG. 16 illustrates a flow chart for adjusting a window size in accordance with an exemplary embodiment. Specifically, FIG. 16 illustrates a flow chart of process element 1509 from FIG. 15. At 1601, the process begins. At 1602, the CPU utilization monitoring module 1202 monitors CPU utilization and updates CPU utilization table 1212. At 1603, the jumping window interval adjusting module 1203 refers to the CPU utilization table 1212. At 1604, the jumping window interval adjusting module 1203 determines if the value of the CPU utilization column 1402 in the CPU utilization table 1212 is less than the value of the upper threshold column 1302 in the window interval adjusting definition table 1211. At 1605, the jumping window interval adjusting module 1203 sets the new jumping window as: Old jumping window interval−(Initial window interval*Adjusting rate). At 1606, the jumping window interval adjusting module 1203 sets the new jumping window as: Old jumping window interval+(Initial window interval*Adjusting rate). At 1607, the process ends.

For example, suppose the CPU utilization at 10:00 is 60% as shown in FIG. 14. At 1604, the jumping window interval adjusting module 1203 would thereby determine that the value of the CPU utilization is less than the upper threshold column. The new jumping window interval=old jumping window interval (60 seconds)−(initial window interval (60 seconds)*adjusting rate (0.05))=57 seconds. As a result, the window interval will shorten from 1 minute to 57 second at 10:01 because the CPU utilization is 60% at 10:00. However, the CPU utilization at 10:03 is 86%. Therefore, at 1604, the jumping window interval adjusting module 1203 would thereby determine that the value of the CPU utilization is greater than the upper threshold column. The new jumping window interval=old jumping window interval (51 seconds)+(initial window interval (60 seconds)*adjusting rate (0.05))=54 seconds. As a result, the window interval will be longer from 51 second to 54 second at 10:04 because the CPU utilization is 86% at 10:03.

Third Exemplary Embodiment

In the first and second exemplary embodiments described, the query parser makes the query execution module based on a query. In a third exemplary embodiment, the query translator outputs a new query from a registered query. The query execution module is generated when the stream data processing engine parses the new query.

Figure 17:
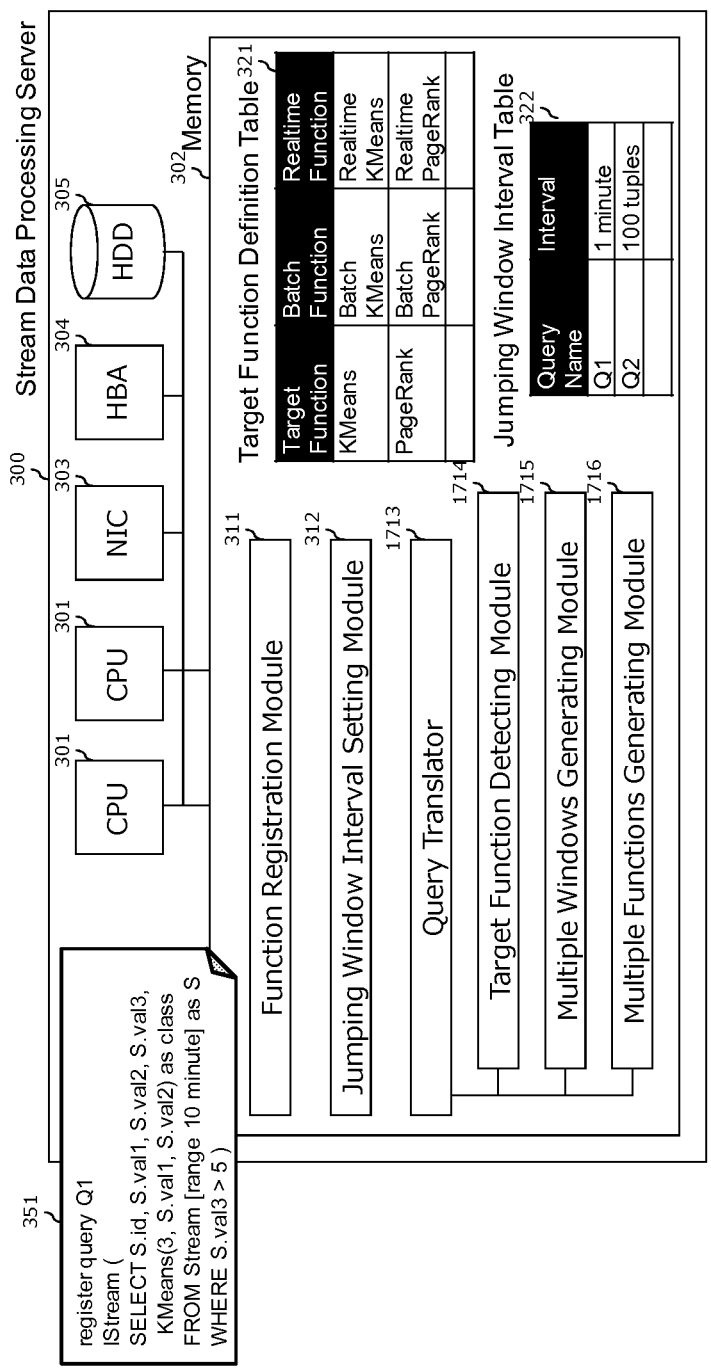
FIG. 17 illustrates a hardware configuration of a stream data processing server, in accordance with an exemplary embodiment.

FIG. 17 illustrates an exemplary hardware configuration of a stream data processing server, in accordance with a third exemplary embodiment. In the configuration shown in FIG. 17, a query translator 1713 is used to make two queries from registered query. The query translator make invoke the target function detecting module 1714, the multiple windows generating module 1715, and the multiple functions generating module 1716. The target function detecting module 1714 functions similarly to the target function detecting module 314 of FIG. 3. The multiple windows generating module 1715 generates a new query which includes a jumping window and a sliding window. The multiple functions generating module 1716 generates a new query which may include a batch function and a realtime function.

Figure 18:
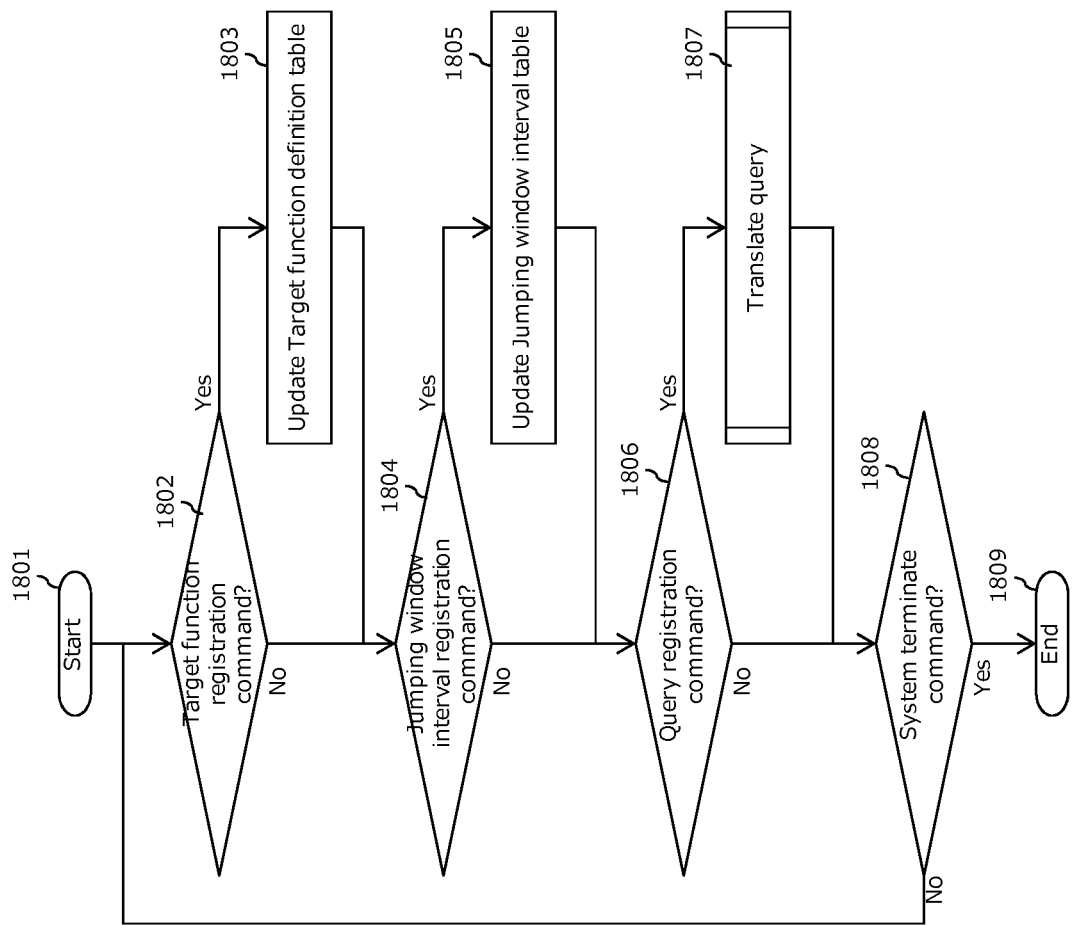
FIG. 18 illustrates a flow chart for the stream data processing server, in accordance with an exemplary embodiment.

FIG. 18 illustrates a flow chart for the stream data processing server, in accordance with an exemplary embodiment. In FIG. 18, process elements 1801-1806, and 1808-1809 are the same as the process elements of 1001-1006 and 1008-1009 as shown in FIG. 10. At 1807, the query translator translates the query. Further details of the query translating are provided in FIG. 19.

Figure 19:
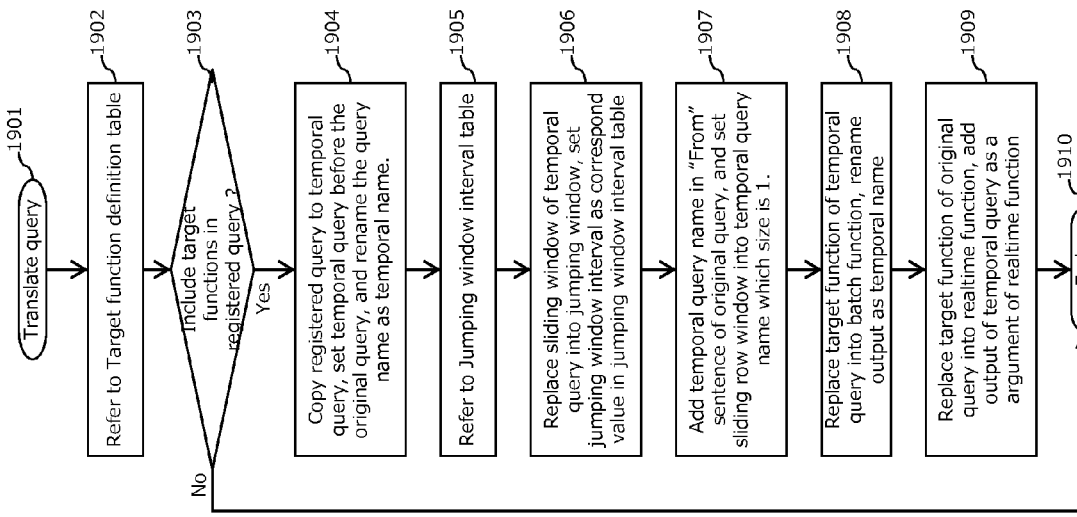
FIG. 19 illustrates a flow chart for the query translator, in accordance with an exemplary embodiment.

FIG. 19 illustrates a flow chart for the query translator, in accordance with an exemplary embodiment. At 1901, the process begins. At 1902, the target function detecting module 1714 refers to target function definition table 321. At 1903, the target function detecting module 1714 determines if the registered query includes a target function from the target function definition table 321. At 1904, the multiple windows generating module 1715 copies the registered query to a temporary query, sets the temporary query before the original query, and renames the query name as the temporary query. At 1905, the multiple windows generating module 1715 refers to the jumping window interval table 322. At 1906, the multiple windows generating module 1715 replaces the sliding window of the temporary query into the jumping window, and sets the jumping window interval to the corresponding value in jumping window interval table 322. At 1907, the multiple windows generating module 1715 adds the temporary query name in the "From" sentence of the original query, and sets the sliding row window into the temporary query name, whose size is 1. At 1908, the multiple functions generating module 1716 replaces the target function of the temporary query with a batch function, and renames the output as the temporary name. At 1909, the multiple functions generating module 1716 replaces the target function of the original query with a realtime function, and adds outputs of the temporary query as an argument of the realtime function. At 1910, the process ends.

FIG. 20 illustrates a translated query example, in accordance with an exemplary embodiment. In the example provided in FIG. 20, the registered original query is from FIG. 4. From the flow chart of FIG. 19, from process element 1903, the target function detecting module 1714 would determine that the registered query includes a target function from the target function definition table 321, because the query includes the Kmeans function. At 1904, the original query is copied into a temporary query. Query 2001 is the temporary query, and query 2002 is the original query. The temporary query name is changed from Q1 to Temp (register query Temp). At 1906, the range sliding window in the temporary query is changed into a jumping window. The jumping window interval is set to 1 minute (FROM Stream [range 10 minute] as S→FROM Stream [range 10 minute jumped every 1 minute]). At 1907, the temporary query name, Temp, is added in the "From" statement of the original query. The sliding row window is set into the temporary query name with a size of 1 (Stream [range 10 minute] as S→Stream [range 10 minute] as S, Temp [rows 1] as G). At 1908, the Kmeans function of the temporary query is changed to BatchKmeans, and output is renamed as gravity (KMeans(3, S.val1, S.val2) as class→BatchKMeans(3, S.val1, S.val2) as gravity). At 1909, the Kmeans function of the original query is changed into RealtimeKmeans. The output of the temporary query is added as an argument of realtime function (KMeans(3, S.val1, S.val2) as class→RealtimeKMeans(3, S.val1, S.val2, G.gravity) as class).

Figure 21:
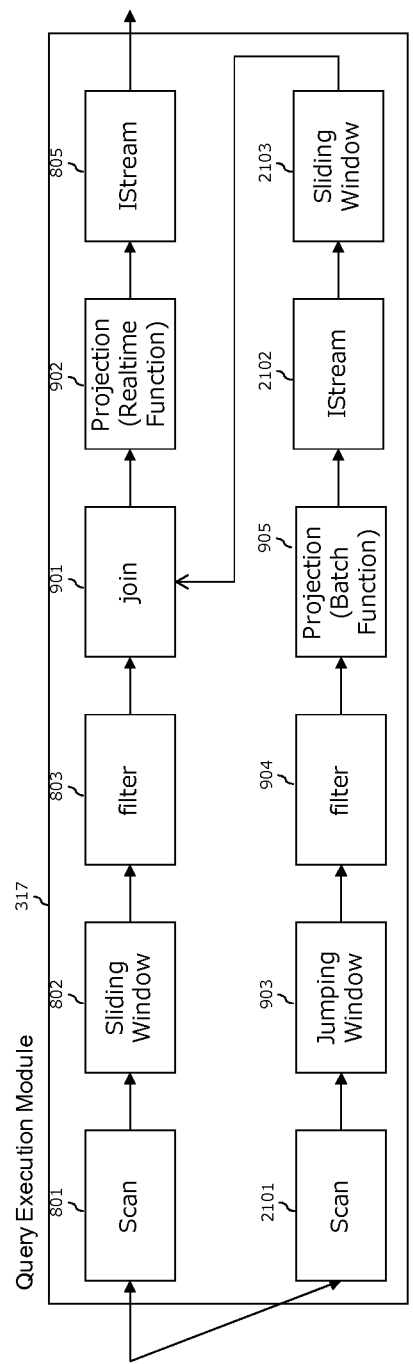
FIG. 21 illustrates a generated query execution module, in accordance with an exemplary embodiment.

FIG. 21 illustrates a generated query execution module, in accordance with an exemplary embodiment. When the stream data processing engine parses the query as shown in FIG. 20, the query execution module as shown in FIG. 21 is generated. The query execution module as shown in FIG. 21 is similar to that shown in FIG. 9. The differences are that elements 2101, 2102, and 2103 are newly added. Element 2101 is a scan operator; element 2102 is an istream operator; and element 2103 is a sliding window operator. The join operator 901 combines outputs of the filter operator 803 and the sliding window operator 2103.

Although a few exemplary embodiments have been shown and described, these exemplary embodiments are provided to convey the subject matter described herein to people who are familiar with this field. It should be understood that the subject matter described herein may be embodied in various forms without being limited to the described exemplary embodiments. The subject matter described herein can be practiced without those specifically defined or described matters or with other or different elements or matters not described. It will be appreciated by those familiar with this field that changes may be made in these exemplary embodiments without departing from the subject matter described herein as defined in the appended claims and their equivalents.

Portions of the detailed description are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the exemplary embodiments, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

The exemplary embodiments also relate to an apparatus for performing the operations herein. This apparatus may be specially constructed for the required purposes, or it may include one or more general-purpose computers selectively activated or reconfigured by one or more computer programs. Such computer programs may be stored in a non-transitory computer readable medium or a computer-readable storage medium, such as, but not limited to optical disks, magnetic disks, read-only memories, random access memories, solid state devices and drives, or any other types of media suitable for storing electronic information. The algorithms and displays presented herein are not inherently related to any particular computer or other apparatus.

Various general-purpose systems may be used with programs and modules in accordance with the teachings herein, or it may prove convenient to construct a more specialized apparatus to perform desired method steps. In addition, the exemplary embodiments are not described with reference to any particular programming language. It will be appreciated that a variety of programming languages may be used to implement the teachings of the invention as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the exemplary embodiments may be implemented using circuits and logic devices (hardware), while other aspects may be implemented using instructions stored on a machine-readable medium (software), which if executed by a processor, would cause the processor to perform a method to carry out the exemplary embodiments. Furthermore, some exemplary embodiments may be performed solely in hardware, whereas other exemplary embodiments may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the exemplary embodiments will be apparent to those skilled in the art from consideration of the specification and practice of the invention disclosed herein. Various aspects and/or components of the described embodiments may be used singly or in any combination. It is intended that the specification and examples be considered as exemplary only, with a true scope and spirit of the invention being indicated by the following claims.

What is claimed is:

1. A non-transitory computer-readable medium storing instructions for executing a stream data processing method that receives stream data input information as primary information and generates secondary information by acquiring primary information within a predetermined period from among the received primary information, the instructions comprising:

managing a plurality of target functions, each of the plurality of target functions relating a first type of processing function from a plurality of first type of processing functions to a second type of processing function from a plurality of second type of processing functions;

selecting a target function from the plurality of target functions based on a query;

executing the first type of processing function and the second type of processing function on the acquired primary information to generate the secondary information, based on the selected target function;

generating a query execution module comprising a plurality of operators for executing the first type of processing function and the second type of processing function based on the selected target function, wherein the generating the query execution module comprises:

copying operators from a sliding window operator to a projection operator of the plurality of operators as a copied set of operators;

connecting a scan operator of the plurality of operators to a copied sliding window operator in the copied set of operators;

generating a join operator before the projection operator and connecting the join operator to a copied projection operator in the copied set of operators;

replacing the copied sliding window operator with a jumping window operator;

associating the copied projection operator with the second type of processing function;

associating the projection operator with the first type of processing function:

wherein the first type of processing function is a real-time processing function;

wherein the second type of processing function is a batch processing function; and wherein the target function is selected from a function for executing a sliding window, a function for executing a jumping window, and a function for executing a sliding window and a jumping window.

2. The non-transitory computer readable medium of claim 1, wherein the instructions further comprise:
   adjusting a jumping window interval based on central processing unit (CPU) utilization.

3. The non-transitory computer readable medium of claim 1, wherein the instructions further comprise:
   parsing an input command for a target function registration command, and add a target function based on the input command to the plurality of target functions when the input command contains the target function registration command;
   parsing the input command for a jumping window interval registration command, and adjusting a jumping window interval based on the input command when the input command contains the jumping window interval registration command; and
   parsing the input command for a query registration command, and parsing the input command for the query when the input command contains the query registration command.

4. The non-transitory computer readable medium of claim 1, wherein the instructions further comprise:
   translating the query into a new query; and
   generating a query execution module based on the new query.

5. The non-transitory computer readable medium of claim 4, wherein the translating the query into the new query comprises translating a function for a sliding window into a function for a jumping window.

6. A server that is configured to receive stream data input information as primary information and generate secondary information by acquiring primary information within a predetermined period from among the received primary information, the server comprising:
   a memory that is configured to:
      manage a plurality of target functions, each of the plurality of target functions relating a first type of processing function from a plurality of first type of processing functions to a second type of processing function from a plurality of second type of processing functions; and
      manage a query execution module comprising a plurality of operators for executing the first type of processing function and the second type of processing function based on the selected target function;
   and, a central processing unit (CPU) that is configured to:
   select a target function from the plurality of target functions based on a query;
   execute the first type of processing function and the second type of processing function on the acquired primary information to generate the secondary information based on the selected target function;
   configure the query execution module by
      copying operators from a sliding window operator to a projection operator of the plurality of operators as a copied set of operators;
      connecting a scan operator of the plurality of operators to a copied sliding window operator in the copied set of operators;
      generating a join operator before the projection operator and connecting the join operator to a copied projection operator in the copied set of operators;
      replacing the copied sliding window operator with a jumping window operator;
      associating the copied projection operator with the second type of processing function;
      associating the projection operator with the first type of processing function:
   wherein the first type of processing function is a real-time processing function;
   wherein the second type of processing function is a batch processing function; and
   wherein the CPU is configured to select the target function from a function for executing a sliding window, a function for executing a jumping window, and a function for executing a sliding window and a jumping window.

7. The server of claim 6, wherein the CPU is further configured to adjust a jumping window size based on CPU utilization.

8. The server of claim 6, wherein the CPU is further configured to:
   parse an input command for a target function registration command, and add a target function based on the input command to the plurality of target functions when the input command contains the target function registration command;
   parse the input command for a jumping window interval registration command, and adjust a jumping window interval based on the input command when the input command contains the jumping window interval registration command; and
   parse the input command for a query registration command, and parse the input command for the query when the input command contains the query registration command.

9. The server of claim 6, wherein the memory further comprises a query translator that is configured to translate the query into a new query; and wherein the CPU is further configured to generate a query execution module based on the new query.

10. The server of claim 9, wherein the query translator is configured to translate the query into the new query by translating a function for a sliding window operator into a function for a jumping window.

* * * * *